(12) United States Patent
Aota et al.

(10) Patent No.: US 6,283,867 B1
(45) Date of Patent: Sep. 4, 2001

(54) ELASTIC SHAFT JOINT

(75) Inventors: Kenichi Aota, Nara; Tooru Fujii, Kurashiki; Hiroyuki Muraosa, Nara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/456,487

(22) Filed: Dec. 7, 1999

(51) Int. Cl.$^7$ .................................................. F16D 3/52

(52) U.S. Cl. ................. 464/74; 74/492; 464/75; 464/83; 464/158

(58) Field of Search .................... 403/372, 365, 403/359.1; 74/492; 464/74, 75, 83, 82, 89, 158

(56) References Cited

U.S. PATENT DOCUMENTS

| | | | |
|---|---|---|---|
| 5,507,203 | * | 4/1996 | Audibert et al. .................... 74/492 |
| 5,672,111 | * | 9/1997 | Schremmer et al. .................. 464/75 |
| 5,916,026 | * | 6/1999 | Sadakata ............................... 464/89 |

FOREIGN PATENT DOCUMENTS

| | | |
|---|---|---|
| 58-50105 | 11/1983 | (JP) . |
| 988993 | * 3/1997 | (JP) . |

* cited by examiner

Primary Examiner—Lynne H. Browne
Assistant Examiner—Aaron Dunwoody
(74) Attorney, Agent, or Firm—Birch, Stewart, Kolasch & Birch, LLP

(57) ABSTRACT

An elastic shaft joint includes: a tube shaft; a shaft coaxially inserted in the tube shaft so that a predetermined axial region of the shaft overlaps with a predetermined axial region of the tube shaft; and a damper inserted between the predetermined axial region of the shaft and the predetermined axial region of the tube shaft for damping vibration and providing an elastic play in a rotation direction. The damper includes: an inner tube fitted to an outside of the predetermined axial region of the shaft and having radially outwardly extending projections at a number of places in a circumferential direction of an outer circumferential surface thereof; an outer tube fitted to an inside of the predetermined axial region of the tube shaft so as to form a desired gap opposite to the inner tube, and having recesses engaging with the respective projections of the inner tube with a gap in the rotation direction; and an elastic body bonded to an inner surface of the recesses of the outer tube in a state of non-contact with at least the projections of the inner tube.

4 Claims, 6 Drawing Sheets

ELASTIC SHAFT JOINT

BACKGROUND OF THE INVENTION

1. Field of the Invention

The present invention relates to an elastic shaft joint (hereafter referred to as a joint) that connects two coaxial shafts in a state having an elastic play in a rotation direction.

2. Description of the Related Art

Such a kind of joint is used, for example, in a steering mechanism of an automobile as shown in FIG. 9. This joint shuts off vibration transmission from a wheel to a steering wheel and allows a steering wheel operation to have an elastic play by utilizing the torsion of a damper.

Referring to FIG. 9, a steering wheel 50, a steering shaft 51, an input shaft 52 of a steering gear device (power steering device), universal joints 53, 54, and a joint 55 are shown.

A conventional joint 55 is disclosed, for example, in Japanese Utility Model Publication No. 58-50105/1983, the contents of which will be hereafter explained with reference to FIGS. 10 and 11, wherein FIG. 10 is a perspective view in an exploded state, and FIG. 11 is a section view.

The joint 55 includes a tube shaft (pipe shaft) 56 being integral with a yoke (not illustrated), a solid shaft 57 inserted in the tube shaft 56, and an elastic body 58 interposed therebetween.

Protrusions 56a to 56c outwardly protruding in the radial direction are disposed at three places on a circumference of the tube shaft 56. Three projections 57a to 57c engaging with the inside of the three protrusions 56a to 56c of the tube shaft 56 with a gap in the rotation direction are disposed at the end of the shaft 57. The elastic body 58 is bonded by vulcanization to both circumferential sides of the first and second projections 57a, 57b and to regions between the three projections 57a to 57c.

The elastic bodies 58 on both sides of the first projection 57a are in contact with inner wall surfaces of the corresponding first protrusion 56a. However, the elastic bodies 58 on both sides of the second projection 57b are disposed to face the corresponding second protrusion 56b with slight gaps $C_1$, $C_1$. Further, large gaps $C_2$, $C_2$ are disposed between the third projection 57c and the corresponding third protrusion 56c.

Referring to FIG. 12, the characteristics of the torsion spring constant brought about by this structure are as follows. The joint has a low spring constant in a minute steering angle range from A to B due to elastic deformation of the elastic body 58 disposed between the first projection 57a and the protrusion 56a; the gap $C_1$ of FIG. 11 disappears when the steering angle reaches B; and the joint has a high spring constant in a steering angle range from B to C due to elastic deformation also of the elastic body 58 between the second projection 57b and the protrusion 56b. When the steering angle reaches C, the gap $C_2$ of FIG. 11 disappears and the torque is directly transmitted. In other words, as a sense of steering operation, when the rotation is started, a gradually increasing elastic reaction is felt in accordance with the increase in the rotation angle, and finally a rigid reaction is felt. This facilitates the steering operation.

The above-mentioned joint has a structure such that the transmitted torque is changed in three steps in accordance with the thickness and presence of the elastic body 58 between the projections 57a to 57c and the protrusions 56a to 56c at three places on the circumference. Therefore, the torque transmitted in each of the gaps between the projections 57a to 57c and the protrusions 56a to 56c is changed, so that an inclination of the tube shaft 56 or the shaft 57 in the rotation direction is liable to be generated. Due to this reason, it is sometimes difficult to obtain a spring constant as designed.

Moreover, since the tube shaft 56 and the shaft 57 have complex shapes, it requires labor in producing the joint 55, and the production costs are high.

SUMMARY OF THE INVENTION

Accordingly, a principal object of the present invention is to provide a joint that can contribute to stability in steering by obtaining a spring constant as designed.

Another object of the present invention is to provide a joint that has a simple structure and can be produced with less labor and at low costs.

Other objects, features, and advantages of the present invention will be apparent from the following descriptions.

An elastic shaft joint according to the present invention comprises: a tube shaft; a shaft coaxially inserted in said tube shaft so that a predetermined axial region of said shaft overlaps with a predetermined axial region of said tube shaft; and a damper inserted between the predetermined axial region of said shaft and the predetermined axial region of said tube shaft for damping vibration and providing an elastic play in a rotation direction, wherein said damper includes: an inner tube fitted to an outside of the predetermined axial region of said shaft and having radially outwardly extending projections at a number of places in a circumferential direction of an outer circumferential surface thereof; an outer tube fitted to an inside of the predetermined axial region of said tube shaft so as to form a desired gap opposite to said inner tube, and having recesses engaging with the respective projections of said inner tube with a gap in the rotation direction; and an elastic body bonded to an inner surface of the recesses of said outer tube in a state of non-contact with at least said projections of said inner tube.

In short, in the present invention, the damper disposed between the tube shaft and the shaft can equalize the torque transmitted between the projections disposed at a number of places on the circumference of the inner tube and the recesses disposed at a number of places on the circumferences of the outer tube. This provides a good rotation balance and prevents the shaft and the tube shaft from being twisted in the rotation direction. In addition, unlike the conventional joint, the tube shaft and the shaft can be produced easily because the damper itself has a simple structure formed with the inner tube, the outer tube, and the elastic body.

Further, if a raised portion is disposed on the elastic body bonded to the inner surface of the recess, one can easily manage to keep constant the gap dimension between the projections and the elastic body bonded to the inner surface of the recesses.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

Figure 1:
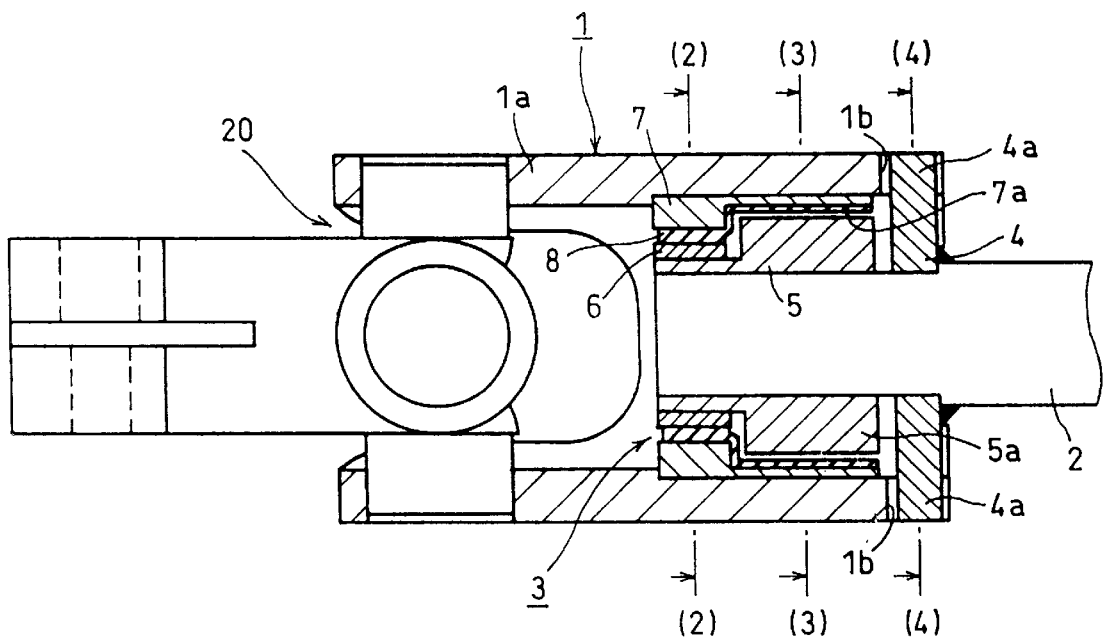
FIG. 1 is a longitudinal section view of a joint according to a first preferred embodiment of the present invention.
Figure 2:
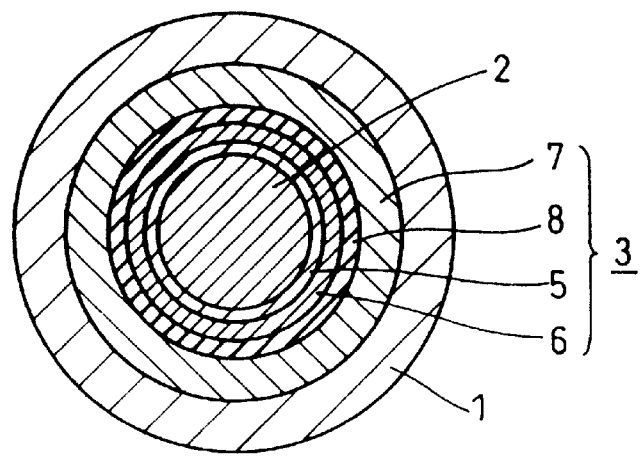
FIG. 2 is a view of a cross section cut along the line (2)—(2) of FIG. 1, as viewed in the direction of an arrow.
Figure 3:
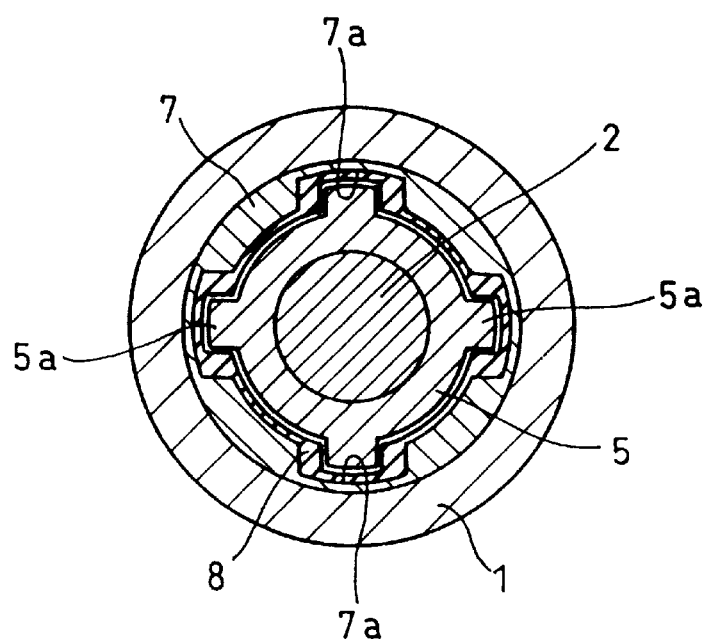
FIG. 3 is a view of a cross section cut along the line (3)—(3) of FIG. 1, as viewed in the direction of an arrow.
Figure 4:
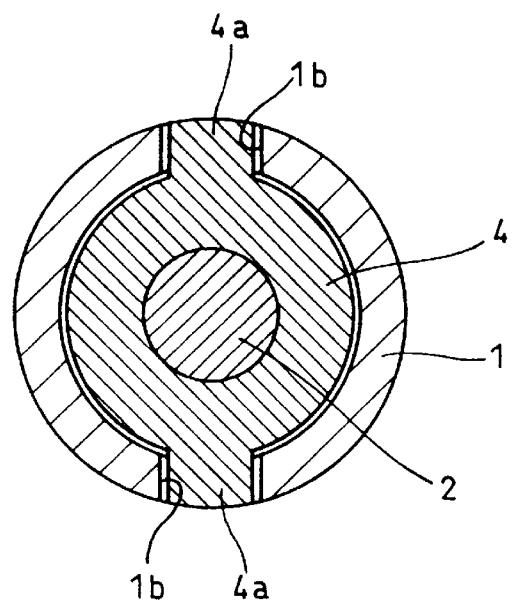
FIG. 4 is a view of a cross section cut along the line (4)—(4) of FIG. 1, as viewed in the direction of an arrow.

Hereafter, preferred embodiments of the present invention will be described with reference to the attached drawings.

With reference to FIGS. 1 to 5, a joint according to a first preferred embodiment of the present invention will be described. A tube shaft 1 includes a yoke 1a formed at one end thereof. A universal joint 20 is mounted to the yoke 1a. A solid shaft 2 extends from another universal joint and is fitted to an inside of the tube shaft 1 from one side thereof in the axial direction so that a predetermined axial region of the shaft overlaps with a predetermined axial region of the tube shaft (in this example, the regions overlapping in the radial direction have approximately a half of the length of the tube shaft 1 from the one side in the axial direction).

A ring-shaped damper 3 is interposed between the predetermined axial region of the tube shaft 1 and the predetermined axial region of the shaft 2.

At the other end of the tube shaft 1, approximately U-shaped cut portions 1b, 1b being open in one axial direction are formed at two places opposing each other by 180° in the circumferential direction. A stopper 4 has a ring-shaped plate structure having an outer diameter being a little smaller than the inner diameter of the tube shaft 1 and is fitted and bonded to an outside of an end of the shaft 2 at positions corresponding to the cut portions 1b, 1b in the tube shaft 1. On the outer circumferential surface of the stopper 4, projecting pieces 4a, 4a radially outwardly projecting to reach the cut portions 1b, 1b are formed at two places being opposite to each other by 180° in the circumferential direction. The projecting pieces 4a, 4a engage the cut portions 1b, 1b to individually have a desired gap in the circumferential direction.

The damper 3 includes first and second inner tubes 5, 6 and an outer tube 7, each of which is made of a metal material, and a ring-shaped elastic body 8 made of a rubber material. The damper 3 has a torsion spring structure in which the torsion spring constant has two-step characteristics due to cooperation of these members, as mentioned later.

The first inner tube 5 is fixed (fitted) to the outside of the shaft 2 with a predetermined axial length by a suitable fixing method such as pressure-fitting. Radially outwardly extending projections 5a are formed at a number of places in the circumferential direction, for example, at four places spaced at an interval of 90°, in an outside circumferential surface region (one axial side region) having approximately half of the axial length of the first inner tube 5 from the one axial side thereof.

The second inner tube 6 is fitted to the outside of the outer circumferential surface region of the first inner tube 5 where the projection 5a is absent.

The outer tube 7 is fixed (fitted) to the inside outside of the tube shaft 1 by a suitable fixing method such as pressure-fitting, and has approximately the same axial length as the first inner tube 5. Recesses 7a are formed in an inner circumferential surface region (one axial side region) of the outer tube 7 having approximately half of the axial length of the outer tube 7 from one axial side thereof, at places individually corresponding to the projections 5a of the first inner tube 5. The recesses 7a engage with the corresponding projections 5a with a gap in the rotation direction.

The outer circumferential surface of the elastic body 8 is bonded to the entire inner circumferential surface of the outer tube 7 by vulcanization or the like. The inner circumferential surface of the elastic body 8 is bonded to the outer circumferential surface of the second inner tube 6 by vulcanization or the like. The portion of the elastic body 8 bonded to the one axial side region of the outer tube 7 is in a state of non-contact with the one axial side region of the first inner tube 5. In other words, a desired gap is provided between each of the projections 5a and the portion of the elastic body 8 bonded to the one axial side region of the outer tube 7, and this gap constitutes a play in the rotation direction.

Figure 5:
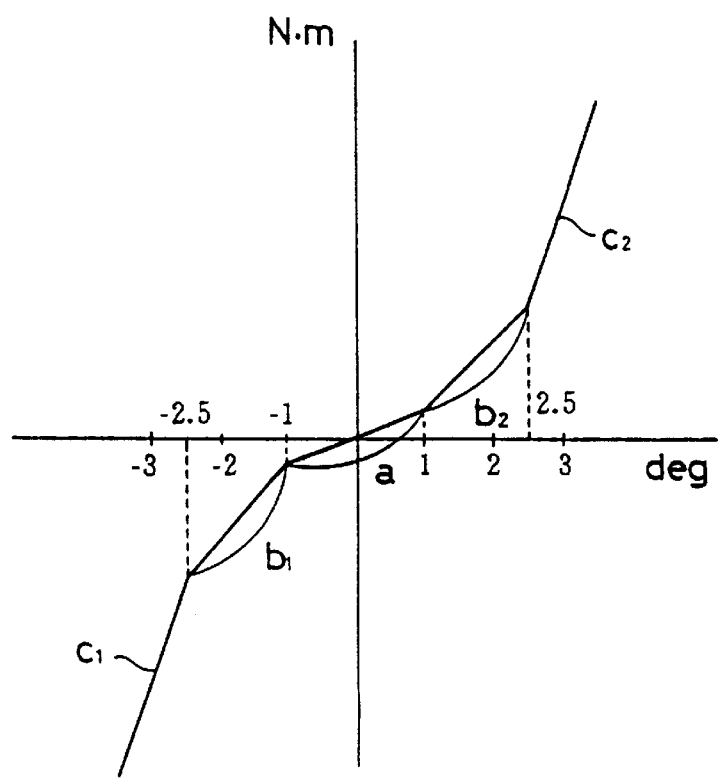
FIG. 5 is a view showing characteristics of a torsion spring constant of the joint of FIG. 1.

The joint constructed in the above-mentioned manner has a structure in which the transmitted torque is changed in three steps by the damper 3 and the stopper 4, as shown by the torque transmission characteristics of FIG. 5, in which the horizontal axis represents regions of a relative rotation angle between the tube shaft 1 and the shaft 2, and the vertical axis represents the transmitted torque.

(1) Region a from −1° to +1°

In this region, the outer tube 7 of the damper 3 rotates a little by the same angle as the tube shaft 1 by a minute rotation of the tube shaft 1 caused by resonance between the tire and the suspension. In accordance therewith, the elastic body 8 between the first inner tube 5 and the second inner tube 6 is twisted. In this region a, the elastic body 8 bonded to the inner surface of each recess 7a of the outer tube 7 does not abut or only slightly abuts each projection 5a of the first inner tube 5, so that the gradient of the curve shown in FIG. 5 is small, giving a low torsion spring constant. Therefore, the resonance between the tire and the suspension, for example, is absorbed by the elastic body 8 and is prevented from being transmitted to the steering wheel. In other words, it fully performs a function of flutter absorption.

(2) Region $b_1$ from −2.5° to −1° and region $b_2$ from +1° to +2.5°

In this region, the rotative force applied to the shaft 2 is transmitted to the elastic body 8 between the first inner tube 5 and the second inner tube 6, and each projection 5a of the first inner tube 5 abuts the elastic body 8 bonded to the inner surface of each recess 7a of the outer tube 7 to transmit the rotative force from the first inner tube 5 to the outer tube 7. This causes the whole elastic body 8 to be deformed by compression, so that the gradient of the curve of FIG. 5 increases, giving a high torsion spring constant. Therefore, a definite reaction is felt when the steering wheel is rotated, and the stability of operation is secured.

(3) Region $c_1$ exceeding −2.5° and region $c_2$ exceeding +2.5°

In this region, the projecting pieces 4a, 4a of the stopper 4 abut the cut portions 1b, 1b of the tube shaft 1, whereby the rotative force is directly transmitted from the shaft 2 to the tube shaft 1.

Here, the above-mentioned angles ±1°, ±2.5° at which the torsion spring constant changes are given only as an example, and these angles may change in accordance with the type and other conditions of the automobile in which the joint of the present invention is used.

Here, in the above-mentioned case, the torque transmitted between each projection 5a of the first inner tube 5 and the recess 7a of the outer tube 7 is set at the same level. This provides a good rotation balance and prevents inclination of the tube shaft 1 or the shaft 2 in the rotation direction. As a result, the stability of operation is improved. Further, since the damper 3 has a simple construction formed by the first inner tube 5, the second inner tube 6, the outer tube 7, and the elastic body 8, the production is easier as compared with the conventional construction in which the tube shaft 1 and the shaft 2 themselves are made in complex shapes, thereby contributing to reduction of the costs.

Also, in the above-mentioned case, the elastic body 8 interposed in the mechanical power transmission path from the first inner tube 5 to the outer tube 7 is bonded to the inner surface of the recesses 7a of the outer tube 7 and is sandwiched between the projections 5a and the inner surface of the recesses 7a at the time of mechanical power transmission, so that the elastic body 8 does not peel off easily. In contrast, if a structure is adopted such that the inner circumferential surface of the outer tube 7 is made in a cylindrical shape and an elastic body 8 is piecewise bonded so as to form recesses 7a at four places on the circumference of the inner circumferential surface, it is surmised that the elastic body 8 is easily peeled off from the outer tube 7 by the rotative mechanical power repetitively applied by the projections 5a. However, in the previously mentioned case, such a problem of the peeling off of the elastic body 8 does not occur.

Figure 6:
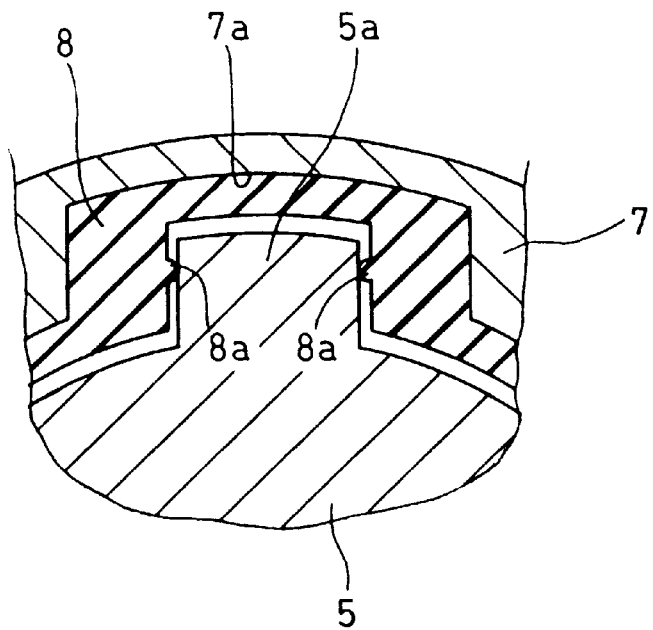
FIG. 6 is an enlarged section view of an essential part of a joint according to a second preferred embodiment of the present invention.
Figure 7:
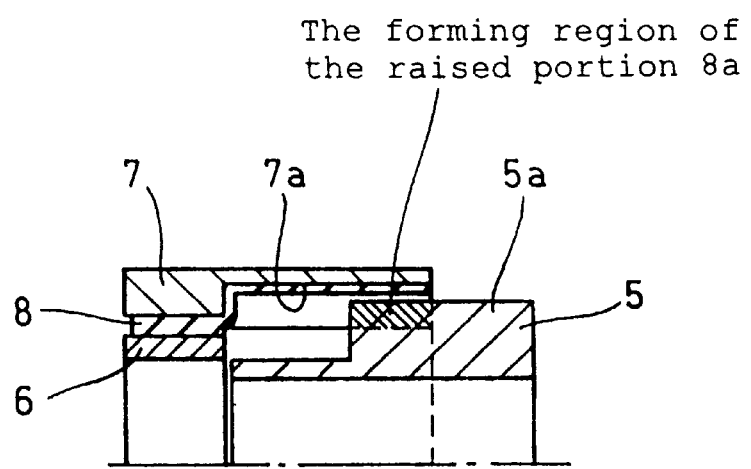
FIG. 7 is an exploded view of the essential part of the joint of FIG. 6.
Figure 8:
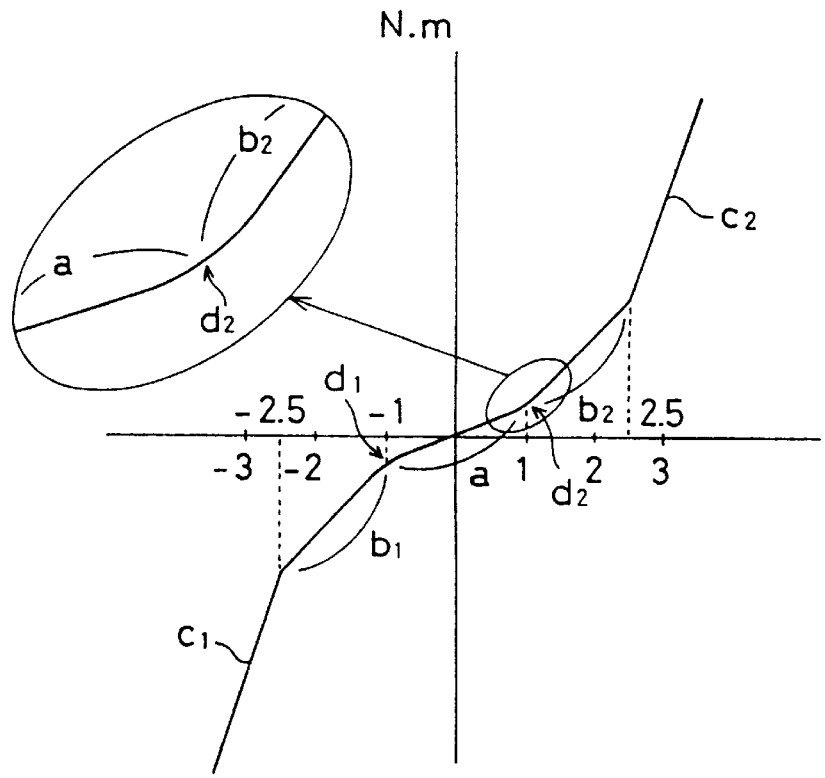
FIG. 8 is a view showing characteristics of a torsion spring constant of the joint of FIG. 6.
Figure 9:
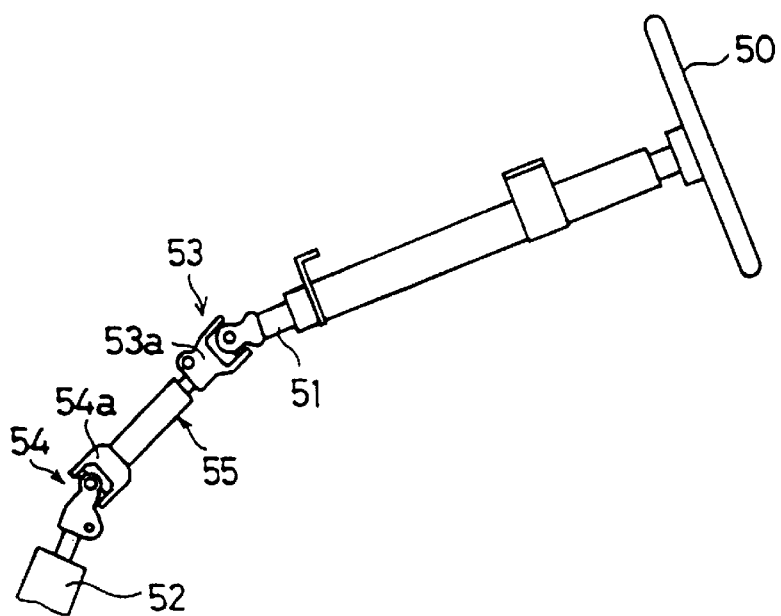
FIG. 9 is a side view showing a steering mechanism of an automobile.
Figure 10:
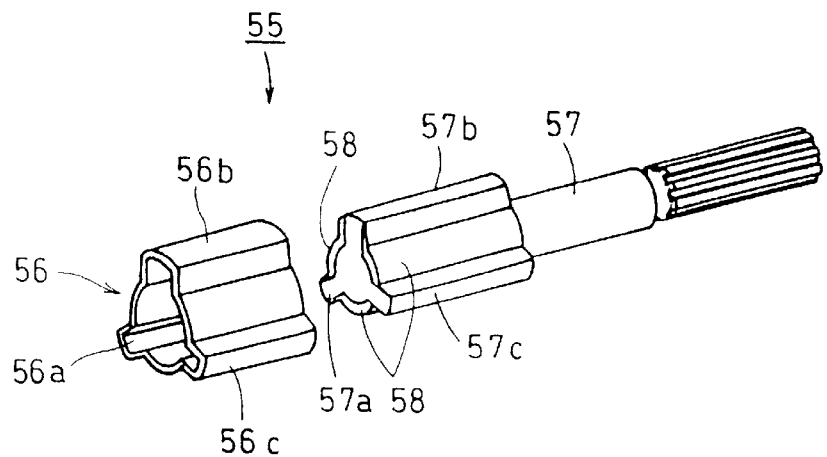
FIG. 10 is an exploded perspective view of a joint of a conventional example.
Figure 11:
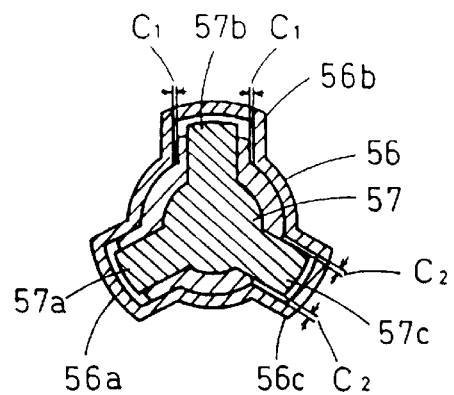
FIG. 11 is a section view of the joint of FIG. 10.
Figure 12:
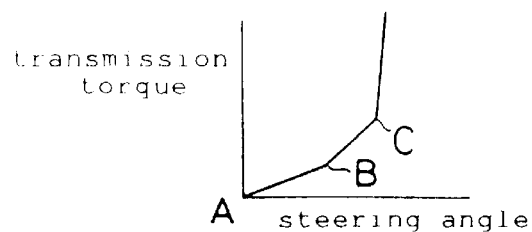
FIG. 12 is a view showing characteristics of a torsion spring constant of the joint of FIG. 10.

With reference to FIGS. 6 to 8, a joint according to a second preferred embodiment of the present invention will be explained. A raised portion 8a is provided on the elastic body 8 bonded to the inner surface of the recess 7a of the outer tube 7. The raised portion 8a maintains the gap between the elastic body 8 and the projection 5a of the first inner tube 5.

In other words, the gap between the elastic body 8 bonded to the inner surface of the recess 7a and the projection 5a is set at the time of incorporating the first inner tube 5 into the outer tube 7. In this case, if the raised portion 8a is disposed, the two gaps on both sides in the circumferential direction can be made to have approximately the same dimension even if the incorporation work is carried out casually, thereby improving the operability. The two gaps are made to have the same dimension in order to equalize the torsion angle in both of the rotation directions, i.e. the normal and reverse rotation directions.

It is preferable to determine the places at which the raised portion 8a is formed by considering the following points. First, in the radial direction, the place for forming the raised portion 8a is approximately at the center. In the axial direction, the place for forming the raised portion 8a is within a region where the elastic body 8 bonded to the inner surface of the recess 7a of the outer tube 7 overlaps with the projection 5a of the first inner tube 5 in the axial direction immediately before the portion of the first inner tube 5 where the projection 5a is absent is fitted to the second inner tube 6, as shown in FIG. 7. By determining the place for forming the raised portion 8a in this manner, the first inner tube 5 is almost in a free state in carrying adjustments for making the two gaps almost equal in the incorporation process, so that the adjustment work is simplified.

In addition, since the raised portion 8a is provided, the boundaries $d_1$, $d_2$ of transition from the region a of low spring constant to the region $b_1$, $b_2$ of high spring constant are made smooth as shown in FIG. 8, thereby making the sense of operation moderate. This is due to the following reason. In the elastic body 8, the raised portion 8a is in charge of initial elastic deformation, so that the resistive force is sufficiently small in the initial elastic deformation. As the elastic deformation gradually proceeds, the elastic body 8 itself is in charge of the elastic deformation, so that the resistive force gradually increases.

Here, it is to be noted that the present invention is not limited to the above embodiments and various applications and changes may be made.

The U-shaped cut portions 1b, 1b of the tube shaft 1 may have a different shape such as an elongated hole. Although the number of projections 5a in the first inner tube 5 is arbitrary, the projections 5a are preferably arranged with equal spacing on the circumference by considering the rotation balance.

With respect to the opposing gap between the elastic body 8 bonded to the inner side surface of the four recesses 7a of the outer tube 7 and the four projections 5a of the first inner tube 5, two gaps opposing by 180° are considered as a pair, and the gap dimension of each pair can be varied between large and small. In this case, the angle at the bending points in the torsion spring constant can be changed.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An elastic shaft joint comprising:
   a tube shaft;
   a shaft coaxially inserted in said tube shaft so that a predetermined axial region of said shaft overlaps with a predetermined axial region of said tube shaft; and
   a damper inserted between the predetermined axial region of said shaft and the predetermined axial region of said tube shaft for damping vibration and providing an elastic play in a rotation direction,
   wherein said damper includes:
   an inner tube fitted to an outside of the predetermined axial region of said shaft and having radially outwardly extending projections at a number of places in a circumferential direction of an outer circumferential surface thereof;
   an outer tube fitted to an inside of the predetermined axial region of said tube shaft so as to form a desired gap opposite to said inner tube, and having recesses engaging with the respective projections of said inner tube with a gap in the rotation direction; and
   an elastic body bonded to an inner surface of the recesses of said outer tube in a state of non-contact with at least said projections of said inner tube.

2. An elastic shaft joint according to claim 1, wherein said inner tube includes a first inner tube fitted to an outside of the predetermined axial region of said shaft and having radially outwardly extending projections at a number of places in a circumferential direction on an outer circumferential surface thereof, and a second inner tube fitted to an outside of an axial desired length region of said first inner tube where the projection is absent, said outer tube is fitted to an inside of the predetermined axial region of said tube shaft in a state that forms a desired opposing gap with respect to said first inner tube, and said recesses engage with the projections of said first inner tube, and said elastic body is bonded to an outer circumferential surface of said second inner tube and to an inner circumferential surface of said outer tube opposing said second inner tube, and is bonded at least to an inner surface of the recesses of said outer tube in a state of non-contact with the projections of said first inner tube.

3. An elastic shaft joint according to claim 2, wherein a raised portion being in contact with said projections is disposed on an inner surface of a portion of said elastic body bonded to an inner surface of the recesses of said outer tube and opposing the projections of said inner tube in a circumferential direction.

4. An elastic shaft joint according to claim 2, wherein said tube shaft has, at an end thereof, a pair of cut portions open in one axial direction at two places opposing to each other by 180° in the circumferential direction, and has a ring-shaped stopper fitted to an outside of an end of said shaft corresponding to said pair of cut portions, and said stopper has a pair of radially outwardly extending projecting pieces disposed at two places on an outer circumferential surface thereof opposing to each other by 180° in the circumferential direction and engaging with each of said cut portions in a state individually having a predetermined gap.

* * * * *